(12) United States Patent
Bechamps et al.

(10) Patent No.: US 6,571,048 B1
(45) Date of Patent: May 27, 2003

(54) UNIVERSAL SPLITTER FOR SPLITTING RIBBON FIBER AND BUFFER TUBES

(75) Inventors: Ronald D. Bechamps, Robbinsville, NJ (US); Vincent H. Tahamont, Jr., Middletown, NJ (US)

(73) Assignee: Antec Corporation, Duluth, GA (US)

( * ) Notice: Subject to any disclaimer, the term of this patent is extended or adjusted under 35 U.S.C. 154(b) by 0 days.

(21) Appl. No.: 09/528,669

(22) Filed: Mar. 20, 2000

Related U.S. Application Data

(60) Provisional application No. 60/161,190, filed on Oct. 22, 1999, and provisional application No. 60/174,448, filed on Jan. 5, 2000.

(51) Int. Cl.[7] ................................................. G02B 6/00
(52) U.S. Cl. ...................................... 385/136; 385/137
(58) Field of Search ............................... 385/136, 135, 385/137, 114, 97, 76, 77, 83, 84

(56) References Cited

U.S. PATENT DOCUMENTS 5,231,685 A * 7/1993 Hanzawa et al. ........... 385/139
5,471,555 A * 11/1995 Braga et al. ................ 385/114

* cited by examiner

Primary Examiner—Lynn D. Feild
Assistant Examiner—Chandrika Prasad
(74) Attorney, Agent, or Firm—John L. Doughty; Tracey D. Beiriger

(57) ABSTRACT

A device that houses a split of either a ribbon fiber, or alternatively a buffer tube, into individual fibers. The device includes a base that has a split area and a strain relief area, which includes a cavity. For strain relief of a ribbon fiber, two bumpers are placed on opposite sides of the ribbon fiber in the cavity, with the surfaces of the bumpers coated with an adhesive. The walls of the cavity prevent movement of the bumpers and ribbon fiber in two directions. A cavity cover that is removably connected to the base prevents movement in a third direction. A split area cover covers the remainder of the base. The cavity cover and the split area cover can be independently attached and removed from the base as necessary. In this manner, the split area cover can be removed to provide access to the split fibers without removing the cavity cover. Alternatively, a buffer tube is strain relieved by tying down the buffer tube within the cavity by routing a tie wrap through at least one aperture in the bottom of the cavity.

16 Claims, 4 Drawing Sheets

UNIVERSAL SPLITTER FOR SPLITTING RIBBON FIBER AND BUFFER TUBES

CROSS-REFERENCE TO RELATED APPLICATIONS

The present application claims the benefit of priority of U.S. Provisional Patent Application Ser. No. 60/161,190 filed Oct. 22, 1999, and of U.S. Provisional Patent Application Ser. No. 60/174,448 filed Jan. 5, 2000, each entitled "Universal Splitter for Splitting Ribbon Fiber and Buffer Tubes".

FIELD OF THE INVENTION

The invention relates generally to a device for housing optical fibers split from a ribbon fiber or a buffer tube.

BACKGROUND OF THE INVENTION

In fiber optic communications networks, many optical fibers are used to transmit signals throughout the network. Because optical fibers are small, multiple optical fibers are often routed together in groups of fibers that are connected or bundled together. One arrangement of multiple optical fibers is a ribbon fiber, which is a group of optical fibers (typically 12 fibers) aligned in a single plane and held together by a film. To access or split out the individual fibers from the ribbon fiber, the film is stripped in the area in which the split is needed. The stripping of the film is usually accomplished using a solvent. The area where this ribbon fiber is split must be protected and the ribbon fiber on one side of the split and the individual fibers on the other must be strain relieved to prevent damage to the fibers.

Another type of multiple fiber arrangement is loose tube fiber, which includes a plurality of groups of fibers (typically from 2 to 12). These groups of fibers are housed in buffer tubes, which are typically made of extruded plastic. To access or split out the individual fibers, the buffer tubing is sheathed in the area access is needed without damaging the fibers. The area where the buffer tube is opened must be protected and strain relieved to prevent damage to the optical fibers.

Devices currently exist for housing optical fiber splits. One such device houses the split of a ribbon fiber. Another device houses the split of loose tube fiber. However, no single device exists for housing the splits from both a ribbon fiber and loose tube fiber. Therefore, there is a need in the art for a single device that houses splits for both ribbon fiber and loose tube fiber.

Additionally, current devices utilize a single cover for covering the device that houses the fiber splits. However, when the cover is removed to reenter the device, the strain relief area is disturbed. This is undesirable because disturbing the strain relief area during reentry subjects the optical fibers to damage. Therefore, there is a need in the art for a device that allows the local area in which a fiber split is housed to be accessed without disturbing the strain relief area.

SUMMARY OF THE INVENTION

The present invention is a device that alternatively houses a split of either a ribbon fiber or a buffer tube into individual fibers or bundles of fibers. The device includes a base that has a split area and a strain relief area, which includes a cavity.

For a ribbon fiber, strain relief is provided by placing two bumpers, preferably made of rubber, on opposite sides of the ribbon fiber in the cavity. The walls of the cavity prevent movement of the bumpers and ribbon fiber in two directions. Movement of the bumpers and ribbon fiber in a third direction is prevented by a cavity cover that is removably connected to the base over the cavity. Preferably, the portions of the rubber bumpers that contact the ribbon fiber are coated with an adhesive, which prevents movement of the ribbon fiber from between the bumpers.

The cavity cover has tabs that mate with receptacles in the base with an interference fit so that the cover holds the bumpers in the cavity. A split area cover covers the remainder of the base to protect the split fibers from dust and handling. Both the cavity cover and the split area cover can be independently connected to and removed from the base. In this manner, the split area cover can be removed to access to the split fibers without removing the cavity cover.

The ribbon fiber can also be placed between a strain relief member before being placed between the bumpers in the cavity. The strain relief member has two similarly shaped portions that are folded onto one another with the ribbon fiber therebetween. The portions are folded at the connection point such that the fold runs in the same direction as the straight section of the member. The surface of each portion that is folded onto each other is preferably coated with an adhesive to better retain the ribbon fiber within the strain relief member. The strain relief member preferably has an extended middle section dimensioned to fit within the cavity to prevent movement of the strain relief member from the cavity.

The same device can also be used to alternatively provide strain relief for a buffer tube. The buffer tube is tied down within the cavity to provide strain relief to the buffer tube. The buffer tube is tied down by routing a tie wrap or any other suitable retaining strap through at least one aperture in the bottom of the cavity. Preferably, there are two apertures spaced apart in the bottom of the cavity, and the tie wrap is routed into the cavity through one aperture, around the buffer tube, and then out of the cavity through the other aperture.

DETAILED DESCRIPTION

Figure 1:
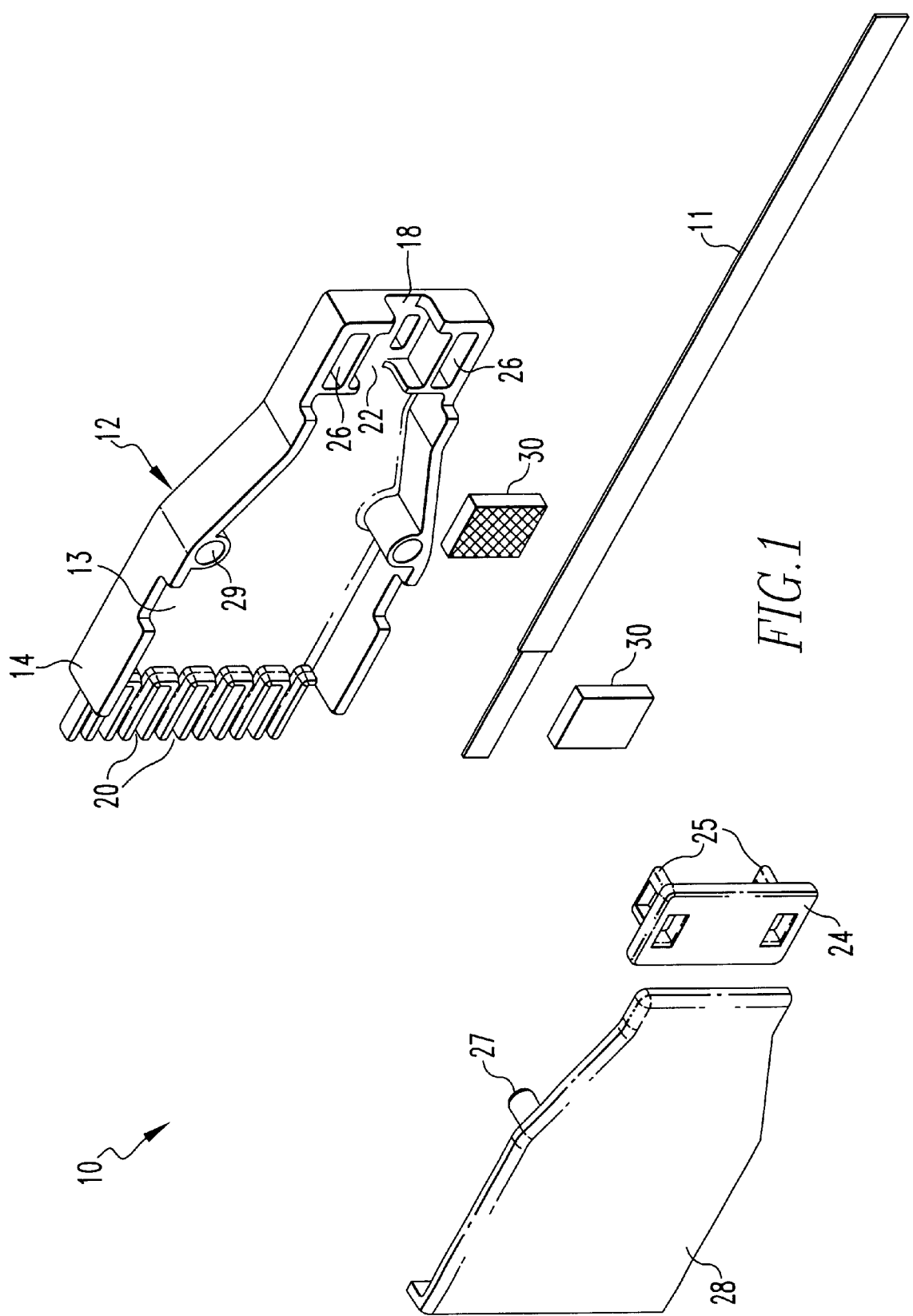
FIG. 1 is a perspective view of the components of a first embodiment of the present invention in which a ribbon fiber is strain relieved in the cavity.

The present invention is a device that alternatively houses a fiber split of either a ribbon fiber or loose tube fiber (each type typically containing 12 fibers) into individual fibers or bundles of fibers (preferably up to 6). These devices are typically housed in a splice enclosure or in a cabinet in which optical fibers are routed and connected. As shown in FIG. 1, the device 10 includes a base 12. The base 12 has a bottom surface 13 and side walls 14 that define a split area in which fiber splits are made. The split area can be seen in FIG. 1 as the large end of the base. The base also includes a strain relief area, which is at the smaller end of the base.

Optical fibers, whether they are contained in the form of a ribbon fiber or loose tube fiber, enter the device through entry port 18 at the small end of the base. The fibers that are split from the ribbon fiber or buffer tube exit the device through exit ports 20 on the large end of the base. Coupled to the entry port is a strain relief cavity 22. As will be explained below, the cavity functions in combination with other components and members to provide strain relief for the fibers.

Figure 2:
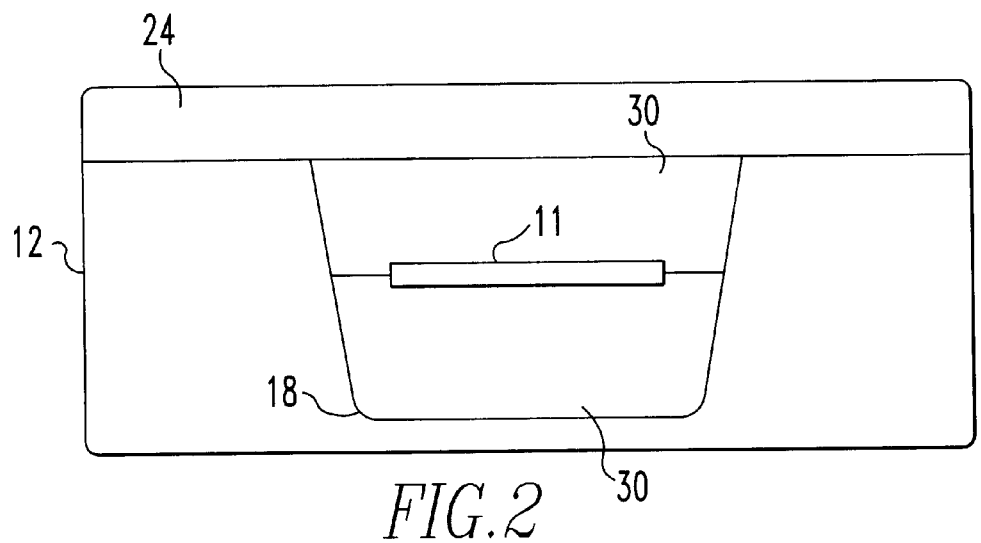
FIG. 2 is an end view showing the ribbon fiber between the bumpers in the cavity.

Strain relief of a ribbon fiber entering the device is provided in either of two ways. The first method of providing strain relief of a ribbon fiber is shown in FIGS. 1 and 2. Two bumpers 30, preferably made of rubber, are placed on opposite sides of the ribbon fiber 11. The two bumpers, with the ribbon fiber located therebetween, are positioned in the cavity. The walls of the cavity prevent movement of the bumpers and ribbon fiber in two directions. Movement of the bumpers and ribbon fiber in a third direction is prevented by a small strain relief cover (cavity cover) 24 that is connected to the base over the cavity. Preferably, the bumpers fit snugly in the cavity to prevent movement. Preferably, the portion of the bumpers that contact the ribbon fiber are coated with an adhesive, which further prevents movement of the ribbon fiber from between the bumpers.

The cavity cover 24 is removably connected to the base to cover the cavity. The cavity cover has tabs 25 that mate with receptacles 26 in the base with an interference or snap fit to hold the bumpers in the cavity. A larger split area cover 28 covers the remainder of the device to protect the split fibers from dust and handling. Cover 28 has dowels 27 extending therefrom that mate with bosses 29 in the base. Both the cavity cover and the split area cover can be independently attached and removed from the base as required. In this manner, the split area cover can be removed to provide access to the split fibers without removing the cavity cover, and vice versa. This is advantageous because it allows reentry to the split area without disturbing the cavity and the strain relief components therein, as will be explained further below.

Figure 3:
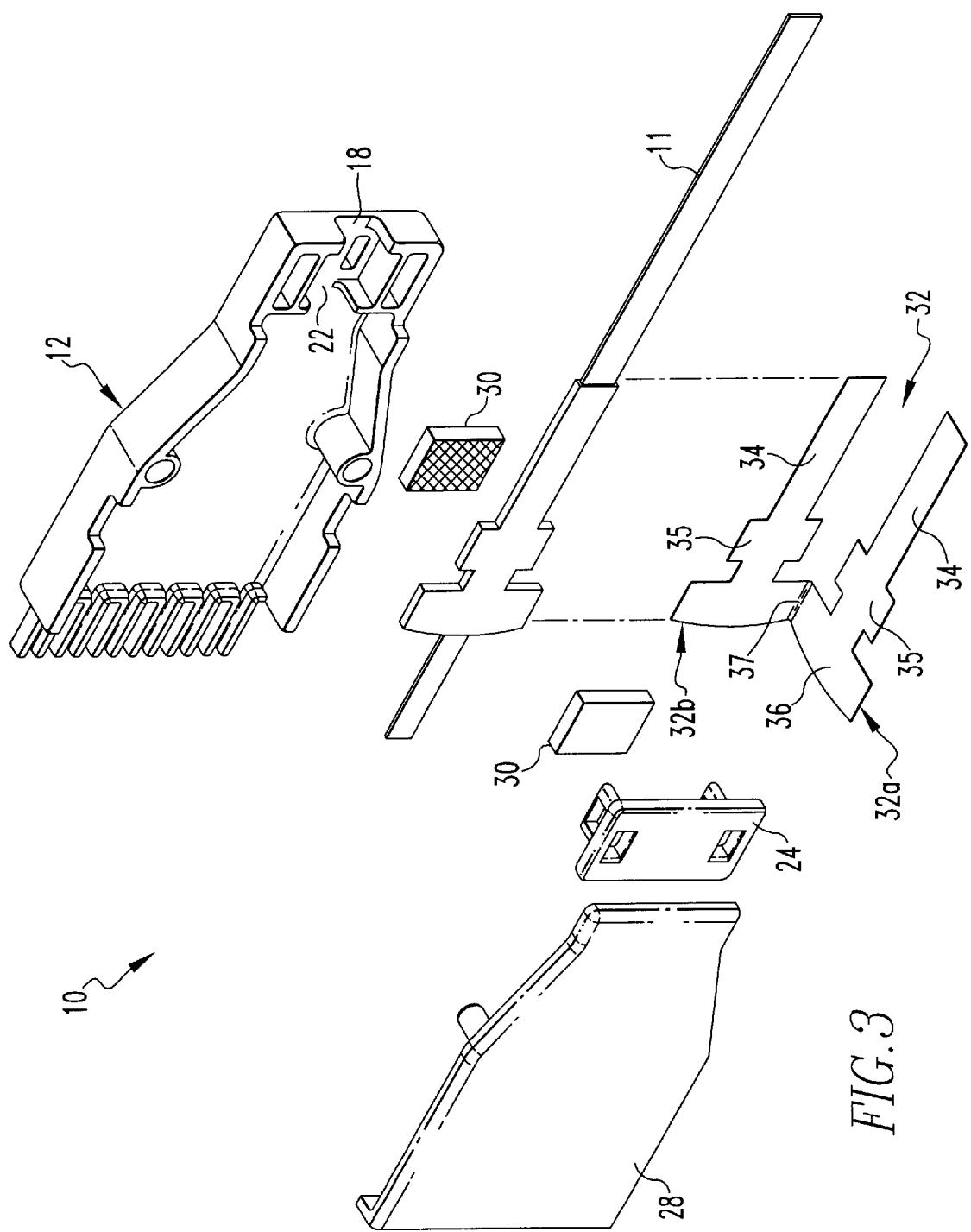
FIG. 3 is a perspective view of the components of a second embodiment of the present invention in which a ribbon fiber is strain relieved with the addition of a strain relief member.

Ribbon fiber can also be strained relieved as shown in FIG. 3. This method of strain relief is identical to that shown in FIGS. 1 and 2, except that the ribbon fiber is placed in a strain relief member 32 prior to being placed between the bumpers in the cavity. The strain relief member 32 comprises two portions 32*a* and 32*b*, each of which is somewhat T-shaped. The portions are preferably, but need not be, identical to each other. Each portion includes a straight section 34, an extended middle section 35, and an end section 36. Portions 32*a* and 32*b* are preferably connected at the end sections at connection point 37, but the portions can also be separated from each other. The connection point 37 is provided such that portions 32*a* and 32*b* are connected side-by-side, so that each portion can be folded over onto the other portion as shown in FIG. 3. The portions are folded along the connection point such that the fold runs in the same direction as the straight section of the member.

Before the portions are folded onto each other, the ribbon fiber is placed on the straight section of one of the portions, such that the ribbon fiber is sandwiched between the two portions when they are folded onto each other. The surface of each portion that is folded onto each other is preferably coated with an adhesive to better retain the ribbon fiber within the strain relief member. It will be understood that if the portions of the strain relief member are not connected, then they cannot be folded onto each other, but they instead could be placed on top of each other and the adhesive on the surfaces of the portions would act to hold the portions together.

At least one portion (but preferably both portions) of the strain relief member 32 has an extended middle section 35 that is dimensioned to fit within the cavity of the base. The straight section 34 is dimensioned to extend through the entry port 18 of the base and extend through an opening on the other side of the cavity within the base into the split area. In this manner, after the ribbon fiber 11 is sandwiched between the portions of the strain relief member 32, the middle section 35 of the strain relief member is positioned in the cavity with the straight portion 34 extending out of the cavity through entry port 18. In this manner, the walls of the cavity prevent the middle section, and thus the entire strain relief member, from moving in two directions. Preferably, bumpers 30 are provided on each side of the middle section 35 of the strain relief member when the member is positioned in the cavity. Preferably, the surfaces of the bumpers that contact the strain relief member are coated with an adhesive. The cavity cover 24 is then connected to the base over the cavity, as described above with reference to FIG. 1.

The strain relief member is preferably made of somewhat stiff material, and when properly installed in the base the straight section 34 extends through the entry port 18 outside of the device. The end section 36 of the strain relief member extends into the split area of the base a certain distance from the cavity. In this manner, the ribbon fiber 11 exits the end section of the strain relief member in the split area of the base, and exits the straight section of the strain relief member a certain distance from the entry port outside the device. This provides stability to the ribbon fiber and prevents the ribbon fiber positioned in the cavity from over-bending as it enters and exits the cavity.

Figure 5:
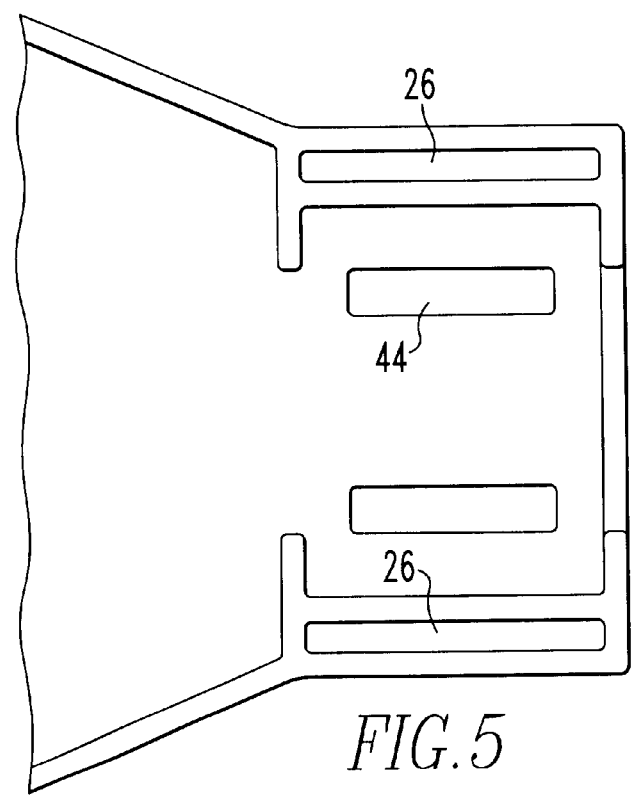
FIG. 5 is a top view of the cavity showing the apertures used to provide strain relief for loose tube fiber.
Figure 4:
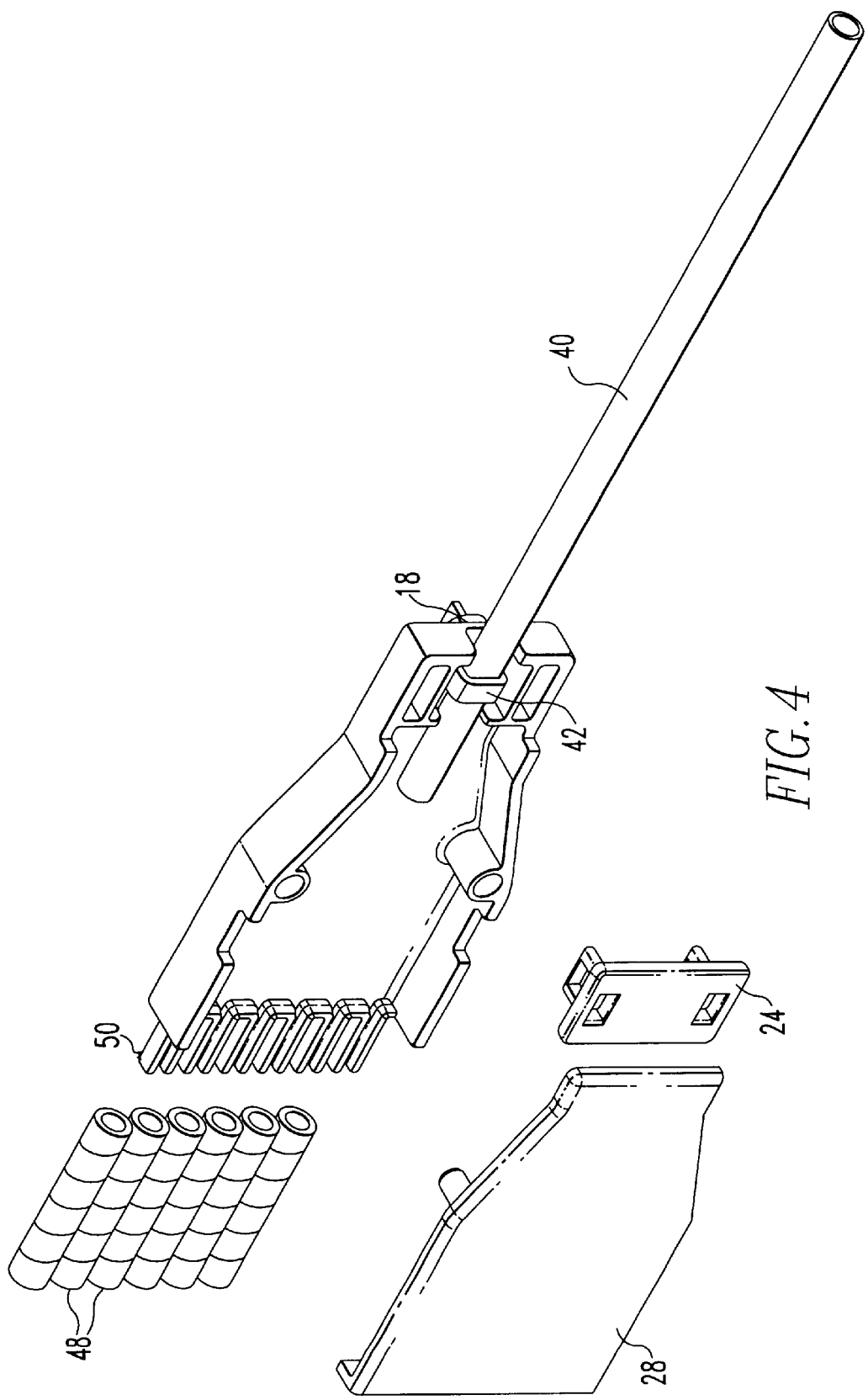
FIG. 4 is a perspective view of the components of a third embodiment of the present invention in which a buffer tube is strain relieved in the cavity.

The same device 10 can also be used to provide strain relief for loose tube fiber, as shown in FIG. 4. A buffer tube 40 containing optical fibers enters the device through entry port 18. The buffer tube extends through the cavity and into the split area of the device, where the fibers in the tube can be separated. The buffer tube is tied down within the cavity to provide strain relief for the buffer tube. The tying of the tube is accomplished by routing a tie wrap 42 or any other suitable retaining strap through at least one aperture 44 in the bottom of the cavity, as shown in FIG. 5. Preferably, there are two apertures spaced apart in the bottom of the cavity, and the tie wrap is routed through one aperture, around the buffer tube, and then through the other aperture. The tie wrap is then tied, bound, or otherwise tightened on the outside of the device, thereby retaining the buffer tube in the cavity and providing strain relief. Cavity cover 24 is then attached to the base over the cavity.

In the split area of the device, the individual fibers from the buffer tube can be split into multiple groups (preferably, from 2 to 6 groups) that are placed into a protective tubing. This protective tubing is strain relieved by inserting it onto or around one of the exit ports 20. Each exit port 20 is dimensioned so that the protective tubing stretches around the port, thereby providing a degree of interference fit, which provides strain relief. Each exit port also preferably includes a saw tooth (not shown) on its perimeter which further provides resistance to pullout of the protective tubing, thereby increasing the strain relief. The split area cover 28 is connected to the base to protect the split area from dust and handling as stated above.

While the preferred embodiments of the invention have been shown and described, it will be obvious to those skilled in the art that various modifications and alterations can be made thereto without departing from the spirit and scope of the invention as defined in the appended claims.

What is claimed is:

1. A device for providing strain relief for a ribbon fiber located therein, comprising:
   a base having a strain relief area coupled to a split area;
   a split area cover removably connected to the base to cover the split area;
   a strain relief cover removably connected to the base to cover the strain relief area;
   wherein the split area cover and the strain relief cover are removably connected to the base independently of each other.

2. The device of claim 1 wherein said strain relief area includes a cavity through which the ribbon fiber passes, and wherein two bumpers are located in the cavity with the ribbon fiber located between said bumpers.

3. The device of claim 2 wherein the surface of each bumper that contacts the ribbon fiber has an adhesive thereon.

4. The device of claim 2 wherein the cavity is defined by walls that prevent the bumpers from moving beyond the cavity.

5. The device of claim 2 further comprising a strain relief member that is provided around the ribbon fiber, wherein the strain relief member extends beyond the cavity.

6. The device of claim 5 wherein the surfaces of the strain relief member that contact the ribbon fiber have an adhesive thereon.

7. The device of claim 5 wherein the strain relief member includes an extended middle section that fits within the cavity, thereby preventing the strain relief member from moving beyond the cavity.

8. The device of claim 7 wherein two bumpers are located in the cavity with the middle section of the strain relief member located between said bumpers.

9. The device of claim 2 wherein the surface of each bumper that contacts the strain relief member has an adhesive thereon.

10. A device for providing strain relief for a ribbon fiber located therein, comprising:
    a base having a split area and a cavity coupled to said split area, wherein the ribbon fiber passes through said cavity;
    two bumpers positioned in the cavity with the ribbon fiber located between said bumpers;
    a cover that is removably connected to the base to cover at least said cavity; and
    wherein the surface of each bumper that contacts the ribbon fiber has an adhesive thereon.

11. A device for providing strain relief for either a ribbon fiber or a buffer tube located therein, comprising:
    a base having a strain relief area and a split area;
    said strain relief area including a cavity through which either the ribbon fiber or buffer tube passes and in which either the ribbon fiber or buffer tube is strain relieved prior to reaching the split area, and wherein the device further comprises a split area cover that is removably connected to the base to cover the split area and a cavity cover that is removably connected to the base to cover the cavity;
    wherein the split area cover and the cavity cover are removably connected to said base independently of each other.

12. A device for providing strain relief for either a ribbon fiber or a buffer tube located therein, comprising:
    a base having a strain relief area and a split area;
    said strain relief area including a cavity through which either the ribbon fiber or buffer tube passes and in which either the ribbon fiber or buffer tube is strain relieved prior to reaching the split area wherein said base includes a plurality of exit ports, and wherein the buffer tube or ribbon fiber contains fibers and after the fibers in the buffer tube or ribbon fiber are split from the buffer tube or ribbon fiber in the split area, the split fibers are positioned in protective tubings, and each protective tubing exits the device through one of the exit ports, in which each exit port provides an interference fit with each protective tubing.

13. The device of claim 12 wherein at least one exit port includes a saw tooth thereon to provide further strain relief for one protective tubing.

14. A device for providing strain relief for a ribbon fiber located therein, comprising:
    a base having a strain relief area and a split area; and
    said strain relief area including a cavity through which the ribbon fiber passes and in which the ribbon fiber is strain relieved prior to reaching the split area, wherein said ribbon fiber is strain relieved in the cavity by placing bumpers in the cavity with the ribbon fiber located between said bumpers.

15. A device for providing strain relief for a buffer tube located therein, comprising:
    a base having a strain relief area and a split area; and
    said strain relief area including a cavity through which the buffer tube passes and in which the buffer tube is strain relieved prior to reaching the split area, said cavity having a bottom and having at least one aperture in said bottom of the cavity, wherein said buffer tube is strain relieved in the cavity by securing the buffer tube within the cavity using a retaining strap that extends through at least one aperture in the bottom of the cavity.

16. The device of claim 15, wherein the retaining strap is a tie wrap.

* * * * *